April 27, 1926.
P. J. BENSON
SPRING WHEEL
Filed Sept. 5, 1925 2 Sheets-Sheet 2
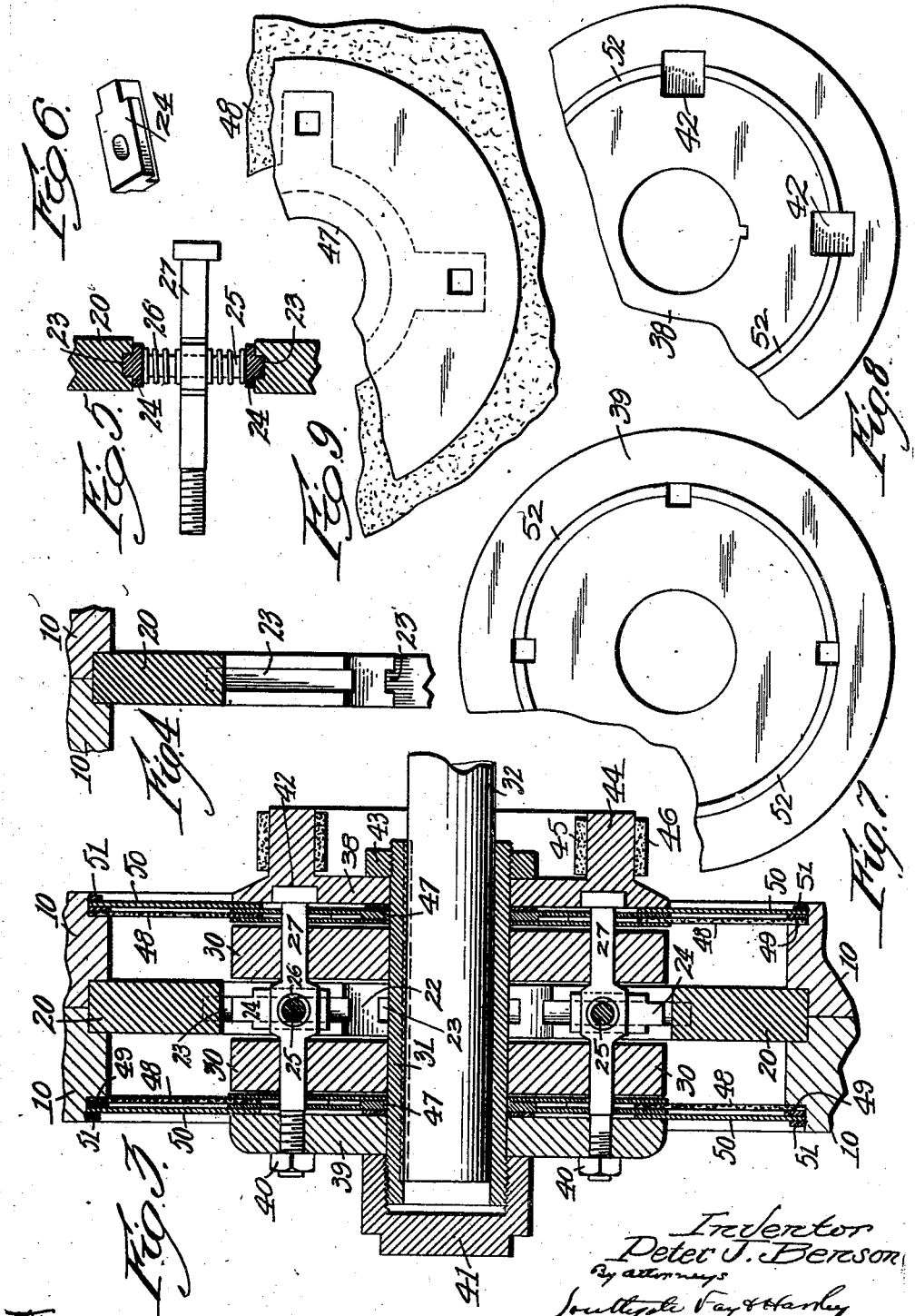

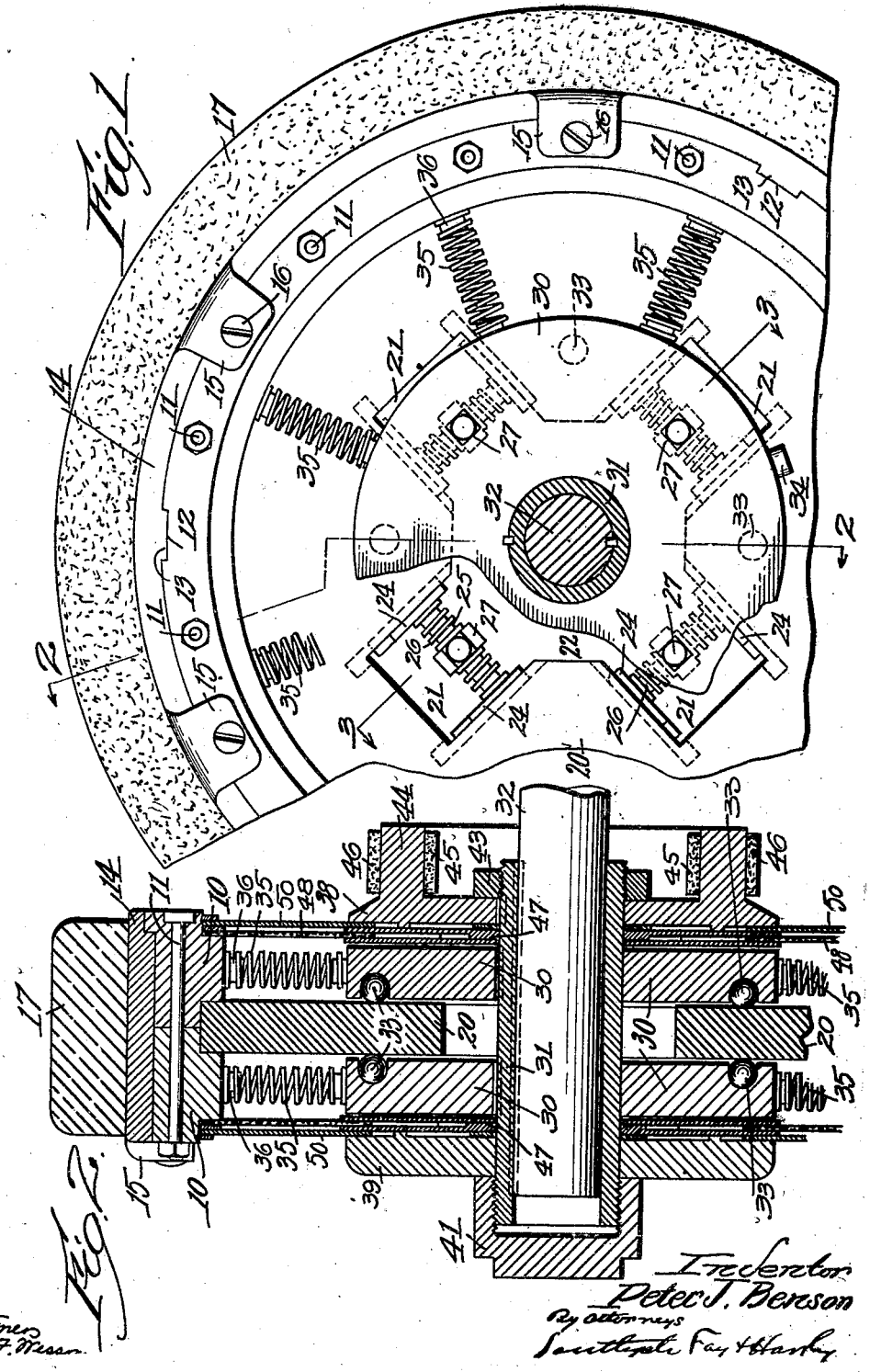

Patented Apr. 27, 1926.

1,582,626

UNITED STATES PATENT OFFICE.

PETER J. BENSON, OF WORCESTER, MASSACHUSETTS.

SPRING WHEEL.

Application filed September 5, 1925. Serial No. 54,667.

*To all whom it may concern:*

Be it known that I, PETER J. BENSON, a subject of the King of Norway, residing at Worcester, in the county of Worcester and State of Massachusetts, have invented a new and useful Spring Wheel, of which the following is a specification.

This invention relates to a wheel capable of use for general purposes but particularly adapted as an automobile wheel.

The principal object of the invention is to do away with the use of pneumatic tires by the employment of a new arrangement of springs to take their place and give the wheel all the flexibility that a pneumatic tire will give it; also to provide means whereby dust and dirt are excluded and the parts are protected from water and dampness; to provide for the application of an ordinary brake to the wheel in a simple and convenient manner; and to provide some of the parts so that they can be made of duplicate pieces in order to reduce expense of manufacture.

Other objects and advantages of the invention will appear hereinafter.

Reference is to be had to the accompanying drawings in which—

Fig. 1 is a fragmentary side view of a driving wheel constructed in accordance with this invention with parts broken away to show interior construction;

Fig. 2 is a sectional view on the broken line 2—2 of Fig. 1;

Fig. 3 is a sectional view on the radial line 3—3 of Fig. 1;

Fig. 4 is a sectional view along the radial guide-way;

Fig. 5 is an elevation of the lever and spring connections, illustrating the guiding means in section;

Fig. 6 is a perspective view of one of the slides shown in Fig. 5;

Fig. 7 is a side view of one of the end discs, showing the inner side thereof;

Fig. 8 is a similar view of the inner side of the opposite end disc; and

Fig. 9 is a similar view showing the thin leather and metal discs for excluding the dust, dirt and moisture.

I have shown the invention as applied to a driving wheel having a rim 10 in two parts bolted together at intervals by bolts 11 extending across between them. These parts have three guide slots 12 in an axial direction on their circumference for receiving projections 13 of a similar shape on a continuous rim 14 preferably of metal. This rim 14 therefore is driven on so that the tongues formed by the projections 13 project into the slots 12 and fit in them. These slots do not extend throughout the width of the rim 10 so that a shoulder is provided constituting a positive stop. Also the rim 14 is provided with ears 15 at intervals which are secured to one of the rim sections 10 by screws 16 to hold these parts firmly together. On the outside is a solid rubber tire 17 secured in any ordinary way.

Securely fixed between the two rim sections 10 and held fixedly to them is a solid central plate 20. This plate is provided with a series of radial recesses 21 and is cut out at the center to form a central square opening 22. These recesses have opposite sides which are parallel to the radial center lines and provided with guides 23. These guides are arranged in pairs, each pair as a whole being radial. In these guides operate slides 24 arranged in pairs and movable radially.

Each pair of slides 24 is connected across by a pin 25 and on each pin are two springs 26. The springs bear against the slides and against a lever 27 held between them and extending in a direction perpendicular to the pin 25. These levers have openings through them for the reception of the pin 25 but not large enough to permit the springs 26 to pass through. It will be obvious therefore that these levers can move in a tangential direction and are restrained by the opposition of the springs 26. The levers 27 extend in opposite directions from the pins 25 through a pair of discs 30. These discs 30 are keyed to a sleeve 31 on the shaft 32 or axle of the wheel. These discs 30 are provided with recesses in which are bearing balls 33 providing a bearing on opposite sides of the plate 20 to reduce friction. The two discs 30 are exactly alike and are provided with short studs 34 radially located on their exterior surfaces. On the studs are mounted springs 35 located in radial position and engaging studs 36 extending inwardly from the rim sections 10. Consequently the shaft is radially supported from the rim in a yielding manner.

The levers 27 have their ends engaging in openings in a pair of discs 38 and 39. These discs are somewhat, but not exactly, alike. The disc 39 is free on the sleeve 31 and has perforations for receiving the ends of the levers which are held on them by nuts 40 on the outside of the disc 39. A nut 41 is screwed on the end of the sleeve 31 and up against the disc 39. The disc 38 is provided with recesses 42 for receiving heads on the ends of the levers 27 constituting fulcrums therefor. This disc is keyed to the sleeve 31. It is also held to it by a nut 43 and is provided with a circular projection 44 having inner and outer brake surfaces for receiving brake shoes 45 and 46 one inside and one outside if that is preferred.

This constitutes the working part of the wheel and it will be seen that the rim can yield radially and circumferentially at all times. The plate 20 is a part of the rim while the plates 30 and 38 are a part of the hub of the wheel. The wheel has no spokes and no sections between the parts of the rim to resist any pressure except the spring-connected members described. The wheel is balanced by having the two discs 30 on both sides of the center and there are springs 35 arranged in the same way. Friction is reduced and the work of the springs decreased by the general construction and arrangement of the parts.

For the purpose of keeping out dust, dirt and moisture, I provide a pair of metal discs 47 on each side arranged loose on the sleeve 31 and having perforations for the levers 27. In between these fits a leather disc 48 in each case. This reaches to the rim and is held in position by an annular washer 49 against the rim members 10. On the outside this leather disc is protected by a metallic disc 50 held by a split steel ring 51 on each side. These rings are beveled and are snapped into a beveled circular recess in the rim, so as to stay in place. These discs 48 and 50 extend in on each side far enough to be covered by the edges of the discs 38 and 39. These thin discs are arranged in this way to keep out water, dirt and dust. Also bearing on the flexible metal discs are annular projections 52 on the inner sides of the two discs 38 and 39 to hold them in place.

In this way the springs are protected and also the bearing balls and their surfaces so as to be capable of lasting a long time. It will be seen that the hub and rim of the wheel are spring connected both tangentially and radially so that the action will be yielding in ordinary driving and when any sudden jar occurs. The hub really consists of the two discs 30 and the disc 38 all being keyed to the sleeve which is in turn keyed to the shaft or axle. The rim comprises the parts 10 and 14 as well as the plate 20. No matter whether the wheel is a rear or front wheel, that is, a driver or driven wheel, the circumferential motion is transmitted from the hub to the rim or vice versa through the tangential springs 26 and also the action is modified by the presence of the levers 27 which equalize the action on the two sides of the wheel. Any vertical motion is transmitted through the radial springs 35 in a yielding manner.

I have illustrated the invention as applied to a driving or rear wheel. Of course it is equally applicable to a front wheel by making obvious changes and leaving out the brake. This would involve taking off projection 44 and brake shoes, and in that case it would not be strictly necessary to fix the disc 38 to the sleeve 31.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described, but what I do claim is:—

1. In a spring wheel, the combination with a rim having means for holding a solid tire thereon, of a central plate fixedly connected with the rim and extending toward the hub of the wheel at the center thereof, a hub for the wheel comprising a pair of discs on opposite sides of the central plate, a series of radial springs separating these discs from the rim all around the circumference, a series of springs arranged tangentially by which the pressure is transmitted between the hub and the central plate, and means connected with each of said tangential springs for equalizing the pressure on the two sides of the wheel.

2. In a spring wheel, the combination with a rim, of a central plate fixedly connected with the rim and extending toward the hub of the wheel, a hub for the wheel comprising a pair of discs on opposite sides of the central plate, a series of radial springs separating these discs from the rim all around the circumference, a series of pins carried by the central plate and arranged tangentially, springs on the opposite ends of said pins by which the pressure is transmitted to and from the central plate, a lever on each pin extending axially through said discs and located between the two springs on each pin, and means at the ends of the hub of the wheel for holding the ends of said levers.

3. In a spring wheel, the combination with a rim and a central plate secured thereto and extending inwardly part way to the hub of the wheel and having recesses therein, of a series of levers extending axially through said recesses, a pair of springs on opposite sides of each lever for transmitting the pressure of the lever to the plate yieldingly in either direction, a pair of discs fixed with respect to the hub of the wheel located on opposite sides of said central plate and overlapping the same and having perforations through which said levers pass, means beyond said discs for anchoring the opposite ends of said levers, whereby the strains due to rotation are transmitted yieldingly from the hub to the rim and vice versa, and radial springs for holding the hub and rim apart.

4. In a spring wheel, the combination with a rim and a plate secured thereto and extending inwardly part way to the hub of the wheel, of a series of levers extending axially, springs on opposite sides of each lever for transmitting the pressure of the lever to the plate yieldingly, a pair of discs fixed with respect to the hub of the wheel located on opposite sides of said plate and overlapping the same and having perforations through which said levers pass, and means beyond said discs for anchoring the opposite ends of said levers.

5. In a spring wheel, the combination with a hub comprising a pair of discs fixed with respect to the axle and spaced apart, a central plate projecting between said discs, and a rim secured to the central plate, of ball bearings between the plate and discs to permit them to move freely with respect to each other, said plate having a series of openings therethrough provided with slides on the opposite surfaces thereof arranged radially, a series of levers passing through said openings and said discs and anchored at points beyond the two discs on their opposite ends, yielding means for connecting said levers with said slides, whereby the levers can move as a whole with the slides toward and from the center, and yielding means for connecting the discs with the rim to permit radial motion.

6. In a spring wheel, the combination with a hub comprising a pair of discs fixed with respect to the shaft and spaced apart, a central plate projecting between said discs, a rim secured to the central plate, and ball bearings between the plate and discs to permit them to move freely in any direction in the plane of the wheel with respect to each other, said plate having a series of radial openings therethrough provided with slides on the opposite surfaces thereof, of a series of levers passing through said openings and said discs, and yielding means for connecting said levers with said slides, whereby the levers can move as a whole with the slides toward and from the center.

7. In a spring wheel, the combination with a hub, of a rim comprising a central plate, said plate having a series of openings therethrough provided with slides on the opposite surfaces thereof, a series of levers passing through said openings, yielding means for connecting said levers with said slides, whereby the levers can move as a whole with the slides toward and from the center, means for connecting the opposite ends of the levers with the hub, and means supported by the hub of the wheel and by the rim for excluding dirt and moisture.

8. In a wheel, the combination with a hub and rim and radial means on both sides of the wheel for yieldingly resisting up and down motion, of a thin metal plate at each end of the hub movable with the hub and extending to the circumference thereof, a leather disc extending in from the rim to a point inside the outer edge of each thin metal plate, and a metal protecting plate fixed to the rim and projecting inwardly to the inner edge of each leather disc, to keep out dirt and moisture.

9. In a wheel, the combination with a relatively movable hub and rim and radial means on both sides of the wheel for yieldingly resisting up and down motion, of two thin metal plates at each end of the hub extending to the circumference thereof, a leather disc extending from the rim to a point between the outer edges of each pair of thin metal plates, a metal protecting plate fixed to the rim and projecting inwardly to the edge of the leather disc outside the outer plate of each pair of the first named metal plates, and a pair of end pieces extending outwardly beyond the inner edges of the last named metal plates to keep out dirt and moisture.

10. In a wheel, the combination with a relatively movable hub and rim and radial means on both sides of the wheel for yieldingly resisting up and down motion, of two thin metal plates at each end of the hub, a leather disc extending between the outer edges of each pair of the thin metal plates, a metal protecting plate fixed to the rim and projecting inwardly to the edge of each of the leather discs, and a pair of end pieces each having a ring engaging the outer thin metal plate of one of said two pairs for forcing them inwardly.

In testimony whereof I have hereunto affixed my signature.

PETER J. BENSON.